United States Patent [19]
Bara

[11] 3,972,073
[45] July 27, 1976

[54] AUTOMATIC TAPE CARTRIDGE EJECTION MECHANISM FOR MULTITRACK CARTRIDGE PLAYERS

[75] Inventor: Edwin Stanley Bara, Chicago, Ill.

[73] Assignee: Motorola, Inc., Schaumburg, Ill.

[22] Filed: Dec. 23, 1974

[21] Appl. No.: 535,773

[52] U.S. Cl. .................................. 360/93; 360/85; 360/132
[51] Int. Cl.² .................. G11B 25/04; G11B 15/10; G11B 15/29
[58] Field of Search .................. 360/93, 96, 83, 85, 360/71, 132; 206/387; 242/55, 19 A, 197–200; 226/89–90, 198

[56] References Cited
UNITED STATES PATENTS

| | | | |
|---|---|---|---|
| 3,485,500 | 12/1969 | Loeschner et al. | 360/93 |
| 3,632,897 | 1/1972 | Ban | 360/93 |
| 3,633,920 | 1/1972 | Ban | 360/93 |
| 3,633,921 | 1/1972 | Ban | 360/93 |
| 3,677,557 | 7/1972 | Ban | 360/93 |
| 3,684,296 | 8/1972 | Ban | 360/93 |
| 3,684,299 | 8/1972 | Clark | 360/93 |
| 3,730,534 | 5/1973 | Ban | 360/93 |
| 3,855,627 | 12/1974 | Vettore et al. | 360/96 |

*Primary Examiner*—Alfred H. Eddleman
*Attorney, Agent, or Firm*—Margaret M. Parker; James W. Gillman

[57] ABSTRACT

When the ignition switch of the automobile is turned off, a solenoid in the tape player is de-energized and the release of its armature pulls a small resilient roller into contact with the tape drive capstan. The capstan forces the roller into a wedged position with a lever arm which in turn activates a cantilevered eject mechanism to eject a tape cartridge. As the cartridge is pushed away from the capstan, it removes power from the capstan. If an attempt is made to insert a cartridge while the key is still "off", the power to the capstan would be restored and, as before, cause ejection of the cartridge.

9 Claims, 6 Drawing Figures

AUTOMATIC TAPE CARTRIDGE EJECTION MECHANISM FOR MULTITRACK CARTRIDGE PLAYERS

BACKGROUND OF THE INVENTION

1. Field of the Invention

The present invention relates to a tape recording/reproducing apparatus utilizing multitrack tape cartridges and, more particularly, to an improved means of preventing insertion of the cartridge and of automatically ejecting the cartridge when the ignition key is turned off, thus preventing deformation of the pinch roller in the cartridge. The mechanism can also provide for easy ejection on demand in electrical or mechanical-electrical mode.

2. Prior Art

Early in the development of cartridge-type tape players, it was apparent that some of the wow-flutter problem could be traced to deformation of the pinch roller in the cartridge caused by being left in "play" position with the power off. Many attempts have been made to prevent this effect from occuring. Two of the most successful are Loeschner et al, U.S. Pat. No. 3,485,500 and Huber, U.S. Pat. No. 3,599,985, both assigned to the same assignee as is the present invention. Both of these include a solenoid and lever mechanisms to eject the cartridge when the power is off. However, in each, as in all similar previous solutions, the size and power requirements for the solenoid were large since all the power for ejection came directly from the solenoid, aided only by the mechanical advantage provided by lever systems. This power requirement, also, meant added cost in the associated electronic circuitry.

SUMMARY OF THE INVENTION

It is, therefore, an object of the present invention to provide automatic ejection and anti-insertion capability of a multitrack tape cartridge when the power supply is turned off.

It is a particular object of the invention to provide these functions at low cost and with very light force, the energy being derived from the kinetic energy stored in the capstan and the fly wheel.

It is another particular object of the invention to provide these functions with simpler, less expensive electrical components.

It is another object of the invention to provide for easier manual removal of a cartridge.

In order to prevent deformation of the pinch roller caused by its being pressed against the capstan in one position for long periods of time, provision is made for ejecting the tape cartridge when the ignition key is turned off and also for preventing insertion of a cartridge while the ignition key is turned off. These functions both derive from a wedge roller being driven by the capstan into contact with the lever arm which activates a cantilever eject mechanism to force the pinch roller of the cartridge out of contact with the capstan. Since the actual motivating force for "eject" is derived from the capstan in the fly wheel, only a very small solenoid is required in order to provide the initiating or triggering function.

Put briefly, a device for ejecting a multitrack cartridge from a cartridge player/reproducer mechanism includes a capstan, a system of levers, a friction roller rotatably mounted on a support member and the support member linked to the armature of an electromagnetic coil for pulling the friction roller into contact with the capstan to derive power from the capstan to activate the lever system and eject the cartridge.

BRIEF DESCRIPTION OF THE DRAWING

FIG. 5b is a schematic diagram of a circuit which could be used with the embodiment of FIG. 5a.

DETAILED DESCRIPTION OF THE DRAWING referring now more particularly to the drawing, FIG. 1 shows an exterior view of a multitrack tape cartridge 10 with a tape player 11 of a type in which the cartridge is used. The cartridge 10 is inserted through an aperture 12 in the front wall of the tape player.

A preferred embodiment is illustrated in FIGS. 2, 3 and 4. FIG. 2 shows a part of the interior of the tape player 11 with the cartridge 10 in position to play and will be best understood in comparison with FIG. 3 wherein the mechanisms of FIG. 2 are shown in eject mode.

Figure 5B:
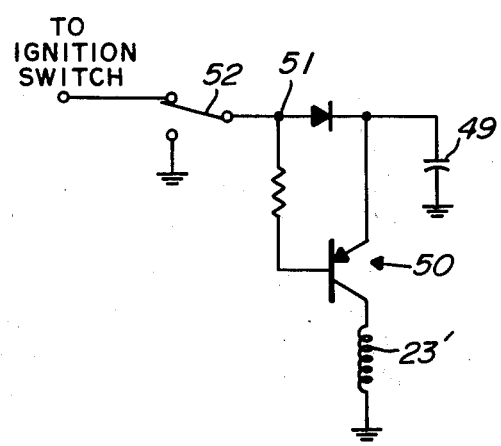

At the heart of the invention is a small resilient wedge roller 13 which is rotatably mounted on a first end of a movable support bracket 14 by a pin 15. The bracket 14 has an elongated aperture 16 through which extends a shaft 17 which in this embodiment is the mounting shaft for the stepping cam 18 (shown in FIG. 4). However, it is only convenient, not essential, to the present invention to use the cam shaft 17 as the guide for bracket 14. At a point 20 on a second end of the bracket 14 is pivotably mounted an actuating link 21 the opposite end of which is connected to the armature 22 of a solenoid 23. A flat spring 24, preferably made of phosphor bronze, is mounted on the armature 22. The spring 24 cooperates with a spiral spring 25, which is coiled around the portion of the actuating link 21 nearest the bracket 14, to allow the armature to override when the solenoid is dis-engaged, then, after cartridge ejection is effected, to return slightly to force the link 21 and bracket 14 to move a sufficient distance to remove contact of the wedge roller 13 upon a capstan 26. The capstan (shown cut-away in FIGS. 2, 3 and 5), presses against a pinch roller 27 in the cartridge 10 in play mode to cause and control the motion of a tape 28 in the cartridge. The function of forcing the roller 13 away from the capstan 26 occurs following the eject function and the roller is maintained in this position until eject is again initiated. The eject function is initiated by turning off the ignition switch (not shown) of the vehicle in which the tape player 11 is installed or by inserting a cartridge while the ignition switch is off. In this embodiment the eject sequence is as follows: turning the ignition to "off" removes power from the solenoid 23 which releases the armature 22 and allows a spring 30 to force the armature into the position it occupies in FIG. 3. (The switching of the power for operating the player itself will be described later.) In FIG. 3, the movement of the armature 22 has operated to cause the actuating link 21 to pull the support bracket 14 and the attached wedge roller 13 to a position wherein the roller 13 has contacted the capstan 26 and the lever arm 31 and by the rotation of the capstan an arm 31 has been caused to pivot about a point 32 on a first end of the arm, causing a second end of the arm to move a lower finger 33 of a cantilevered eject mechanism 34 (shown more clearly in FIG. 4) in a plane parallel to a cartridge support surface 35 and in a direction away from the cartridge 10. This motion of the lower finger 33 has forced an upper finger 36 to move in the opposite direction, thereby causing the cartridge to be forced out of play position and, specifically, removes the pinch roller 27 and the tape from contact with the capstan 26. The purpose of this action is to prevent the pinch roller 27 from becoming permanently or semipermanently deformed by being pressed against the capstan 26 when the ignition key is turned to its off position.

The circuit (not shown) which supplies power to the two leads 37 of the solenoid 23 is disconnected when the ignition system of the vehicle is turned off. On the other hand, the power to operate the tape player 11 is not connected through the ignition switch (not shown) but rather is connected through a switch 42. Energy, then, is still being supplied to the capstan 26 after the ignition switch is turned off, and, thus, to the wedge roller 13 during ejection so that the fly wheel 38 (shown in FIG. 4) does not supply all of the power for ejection. When the eject function is completed, the cartridge has been moved in the direction of an arrow 40, releasing a push bottom 41 of the switch 42 which removes power from the tape player and capstan until a cartridge is fully inserted again.

As long as the ignition key is off, and there is no cartridge being inserted into the tape player, there is no power being used by any part of the player. However, if an attempt is made to insert a cartridge while the ignition key is off, the pushbutton 41 of the switch 42 is depressed by the cartridge, and power is supplied to the capstan 26. The cartridge insertion will also push back the upper finger 36 of the cantilever eject mechanism 34 and the lower finger 33 will be forced forward, thus resetting the lever arm 31 and the wedge roller 13 in position for eject. The capstan will now drive the wedge roller 13 up into the wedged position as shown in FIG. 3. The eject sequence is then repeated as described above.

Shown in these figures for relative position only are a contact mechanism 43 which senses the end of a tape track, a tape guide 44, a tape head 45 and its mounting and positioning mechanism 46, and a detent mechanism 55.

Figure 1:
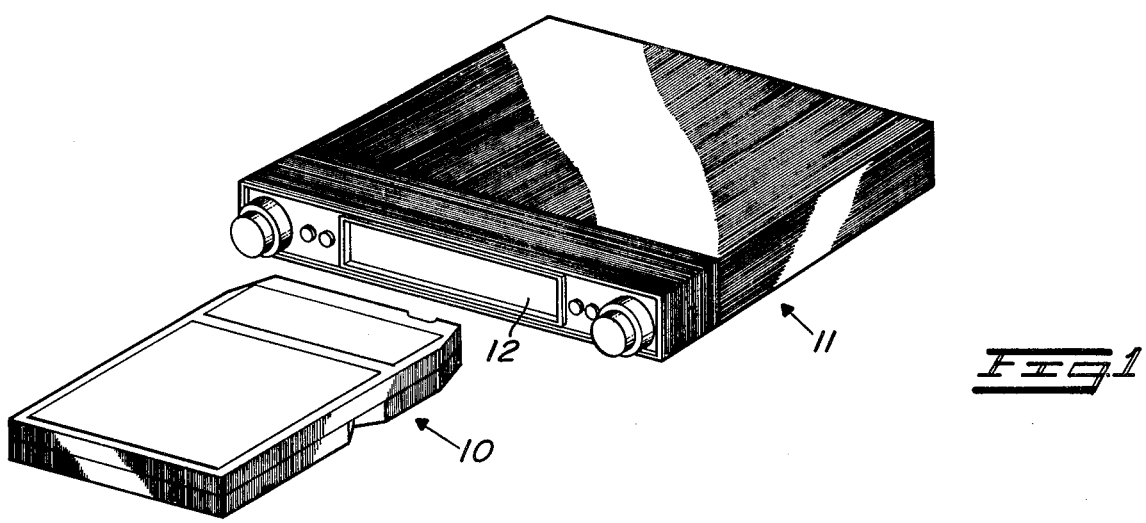
FIG. 1 is a perspective view of a typical multitrack tape cartridge with cartridge player in which the invention is used.
Figure 2:
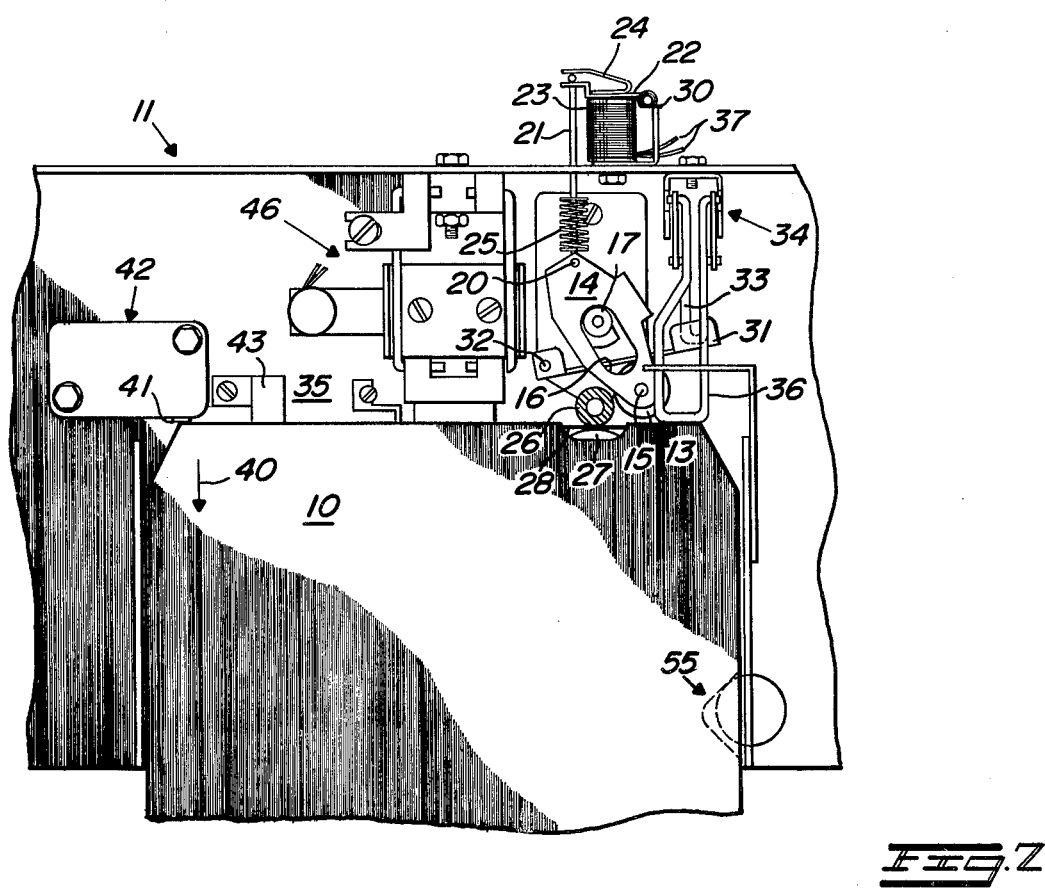
FIG. 2 is a top view of part of the interior of the player of FIG. 1, showing a preferred embodiment in the "play" position.
Figure 3:
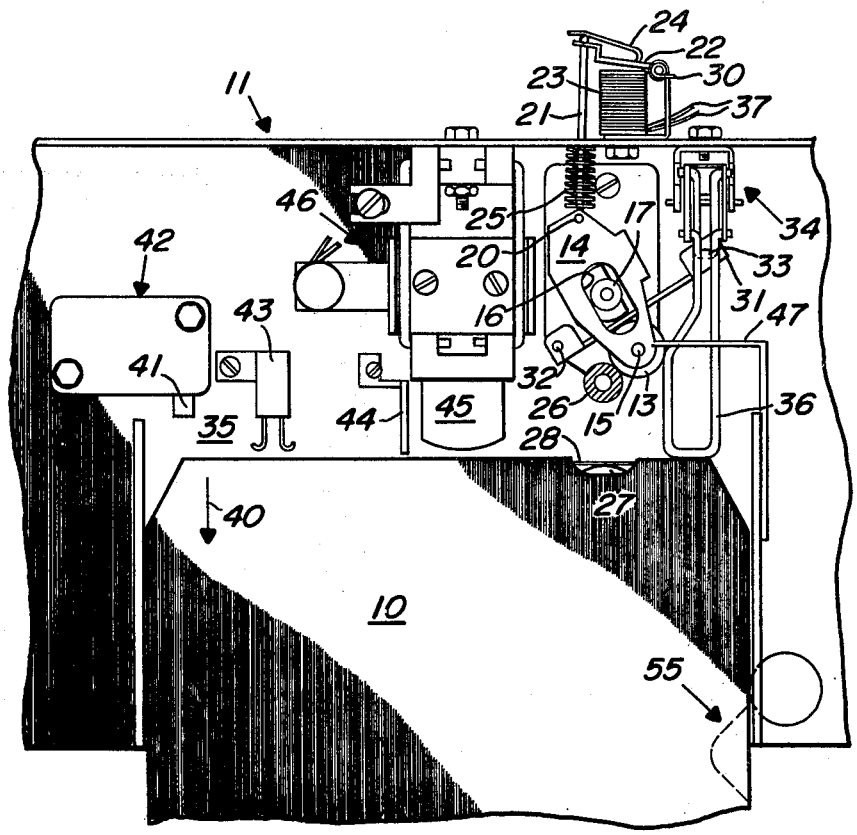
FIG. 3 is also a top view of a part of the interior of the tape player showing the same embodiment as shown in FIG. 2 after "eject" has been initiated.
Figure 4:
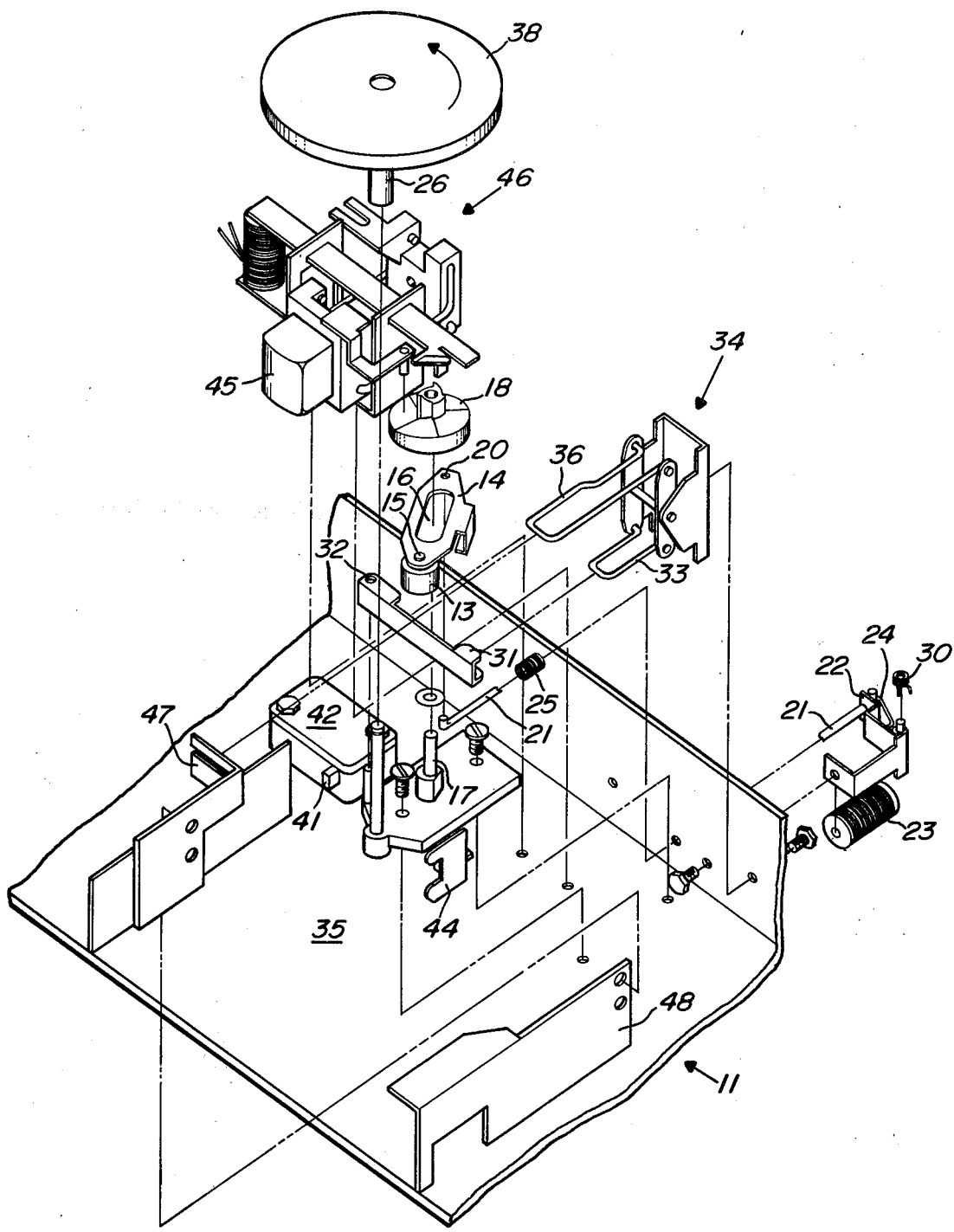
FIG. 4 is an exploded perspective view of the tape cartridge ejection mechanism and associated components, according to the invention shown in FIGS. 2 and 3.

FIG. 4 is an exploded view of essentially the same components as are shown in FIGS. 2 and 3. Additional parts previously referred to but not previously shown include the fly wheel 38 and the cam 18. Also shown here is a guide 47 for the upper finger 36 of the cantilever eject mechanism 34. The guide 47 shown in this embodiment as fastened to a cartridge retaining wall 48 of the tape player, however, it is immaterial to the spirit and scope of the invention whether the guide 47 and the wall 48 are separate or a single part.

Figure 5A:
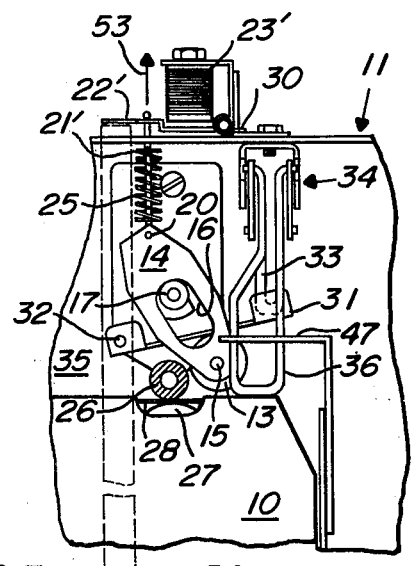
FIG. 5a is a top view of another embodiment of the present invention in "play" position.

FIG. 5A shows another embodiment wherein identical parts have the same reference numbers and similar but slightly different parts have a prime added. The operation of this embodiment differs from the previously described one in that a solenoid 23' is not energized until the instant the ignition key is turned to off. One possible circuit for doing this is given in FIG. 5B, wherein a capacitor 49 is charged by the battery supply (not shown) when the auto ignition is on. In this condition a transistor 50 is off and no current flows through the solenoid 23'. When the auto ignition is turned off, the voltage at a point 51 drops to zero and capacitor 49 discharges through the transistor 50, energizing the solenoid 23' briefly. Alternatively, a manually operated, single pole double throw switch 52, mounted on the control panel (not shown) of the tape player, may be used to drop the voltage at the point 51 to energize the solenoid 23' to eject the cartridge at any time the user wishes. Returning to FIG. 5A, when the auto ignition is "on", the solenoid 23' is not energized and its armature 22' is held in the position shown in FIG. 5A by the action of the spring 30. The spring 25 exerts sufficient pressure on the support bracket 14 to keep the wedge roller 13 from contacting the capstan 26. When the solenoid is momentarily energized, the armature is moved in the direction of an arrow 53, and an actuating link 21' pulls the support bracket 14 into position whereby the wedge roller 13 comes into contact with the capstan 26. The wedge roller is then driven by the rotation of the capstan into contact with the lever arm 31, forcing the free end of the lever arm against the lowwer finger 33 of the cantilever eject mechanism 34 which causes the upper finger 36 to push the cartridge away from the capstan. Reinsertion of a cartridge resets the eject mechanism 34 for further use, but, in this embodiment, there is no provision for preventing insertion of a cartridge while the ignition is off. All power is removed when the ignition switch is turned off. An advantage of this embodiment is that, since the solenoid 23 is energized only briefly, at the time of ejection, and the energy stored in the fly wheel is used for the ejection operation, there is no load, however small, on the power supply system of the vehicle other than during ejection.

Shown in dotted lines FIG. 5A is a manual mechanical eject device 54 which could be constructed in a variety of physical configurations, the only requirement being that the user have means for manually exerting pressure on the armature 22', moving it in the direction of the arrow 53, thus initiating the cartridge eject function as desired. Since the actual force for ejection is supplied by the rotating capstan, whether the function is initiated manually or automatically, the only manual force required is a light push on the armature to bring the wedge roller into contact with the capstan and the lever arm 31. An analogous manual-mechanical device could obviously be made a part of the embodiment of FIGS. 2, 3 and 4. It is also obvious that a single pole, single throw switch (not shown) could be positioned available to the user and connected to open one of the leads 37 of the solenoid 23 of FIGS. 2, 3 and 4, thus initiating the eject function at will. When ignition off is referred to, it should be understood that this may or may not include the "auxiliary" position of the ignition switch.

It should be noted that, although the invention has been shown and described in the environment of a motor vehicle, there is nothing inherent in the invention to so limit it.

What is claimed is:

1. In a magnetic tape recorder/reproducer mechanism for utilizing a multitrack tape cartridge, a device for ejecting the cartridge, the device comprising:
a capstan;
lever means for ejecting the cartridge;
friction means for transferring actuating force from the capstan to the lever means, and including a movable support member, a linking means for activating the support member, a friction roller rotatably mounted on the support member, the roller deriving power for ejection from the capstan; and
electromagnetic means for actuating the linking means and the movable support member to bring the friction roller into wedging contact with the rotating capstan and a portion of the lever means, whereby the lever means is activated.

2. A device as in claim 1 wherein the lever means comprises; a cantilevered eject mechanism having upper and lower fingers; and a pivotally mounted lever arm for cooperating with the friciton means to exert force on the lower finger of the cantilevered eject mechanism, the lower finger coacting with the upper finger to cause ejection of the cartridge from the recorder/reproducer mechanism.

3. A device as in claim 1 wherein the electromagnetic means comprises an armature for exerting force on the linking means of the friction means, and an electromagnetic coil for activating the armature.

4. A device as in claim 3 wherein the armature is also adapted for manual activation.

5. A device as in claim 3 wherein the armature pulls the friction roller of the friction means into contact with the capstan when the electromagnetic means is deenergized, the friction means also includes a spring for moving the friction roller away from the capstan following ejection of the tape cartridge, and wherein the capstan is empowered whenever a cartridge is fully inserted into the player.

6. A device as in claim 3 wherein the electromagnetic means causes ejection of the cartridge when the electromagnetic coil is energized, means for momentarily energizing the electromagnetic means by the removal of power from the tape recorder/reproducer mechanism and the friction means also includes a spring for positioning the friction roller away from the capstan when the electromagnetic means is not energized.

7. A device as in claim 3 wherein the electromagnetic means further includes switching means for nonautomatic activation of the electromagnetic coil.

8. A device as in claim 3 wherein the capstan is empowered after the coil is deactivated and until the cartridge ejection has occured for automatically ejecting a cartridge when power is removed generally from the device.

9. In a magnetic tape recorder/reproducer mechanism for utilizing a multitrack tape cartridge, the mechanism including a capstan for causing motion of the tape through the mechanism and a tape drive system for supplying motive power to the capstan, a device for causing ejection of the tape cartridge from the mechanism, the device including in combination:
a lever system for ejecting the cartridge;
friction means including a friction roller; and
electromagnetic means for bringing the roller into contact with the rotating capstan and a portion of the lever system, whereby the friction roller is empowered by the capstan to activate the lever system.

* * * * *